March 26, 1940.  O. C. SPURLOCK  2,195,155
AIR PRESSURE INDICATOR SWITCH
Filed June 26, 1939   3 Sheets-Sheet 1
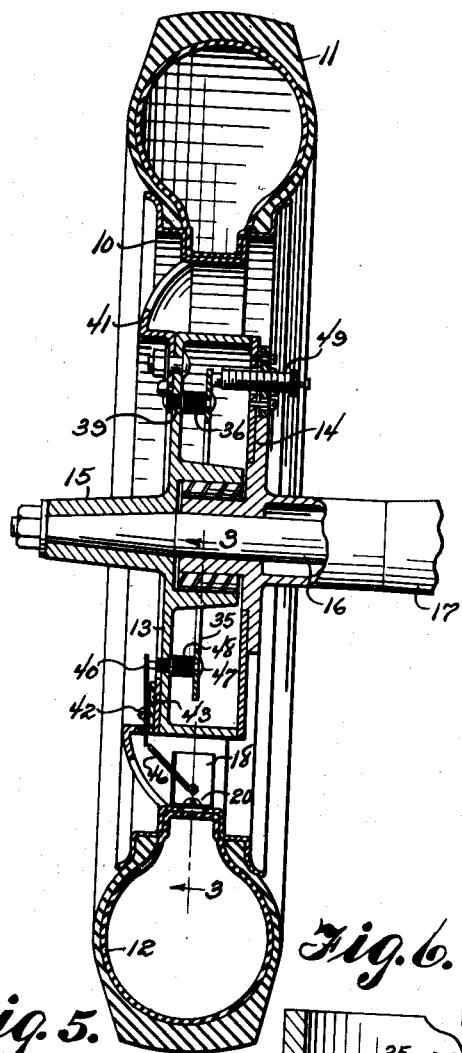
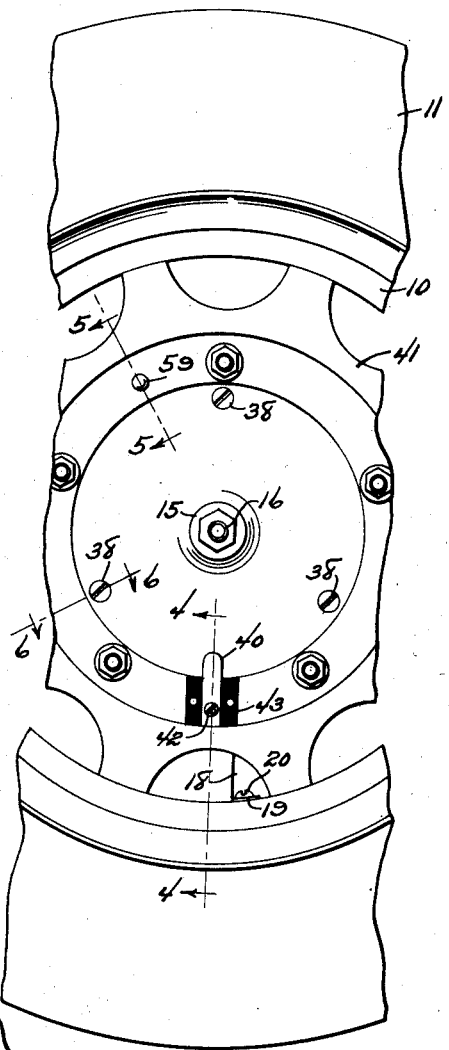
Oliver C. Spurlock
INVENTOR
BY Victor J. Evans & Co.
ATTORNEYS March 26, 1940.　　　O. C. SPURLOCK　　　2,195,155
AIR PRESSURE INDICATOR SWITCH
Filed June 26, 1939　　　3 Sheets-Sheet 2
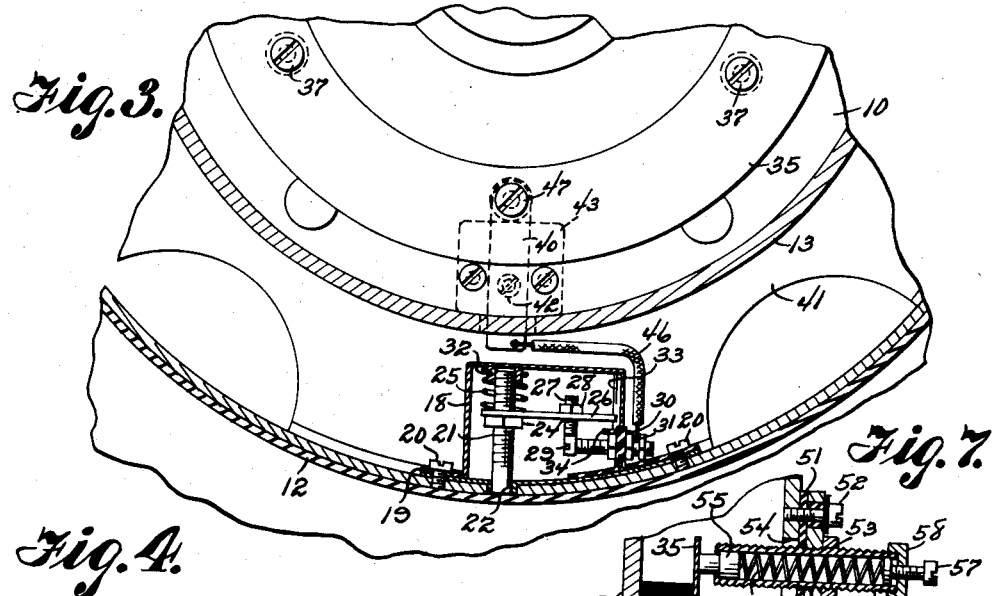
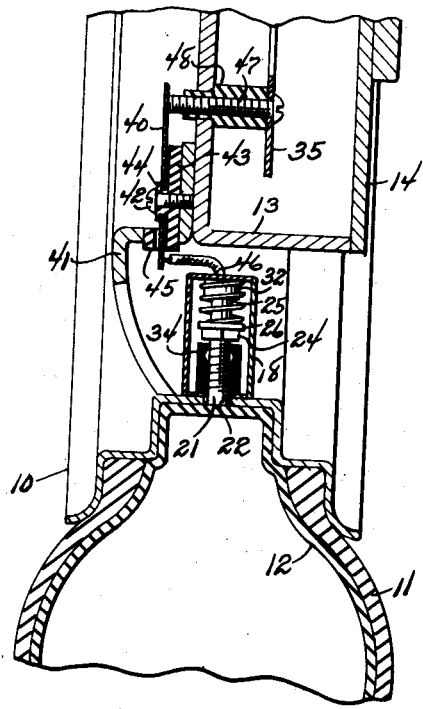
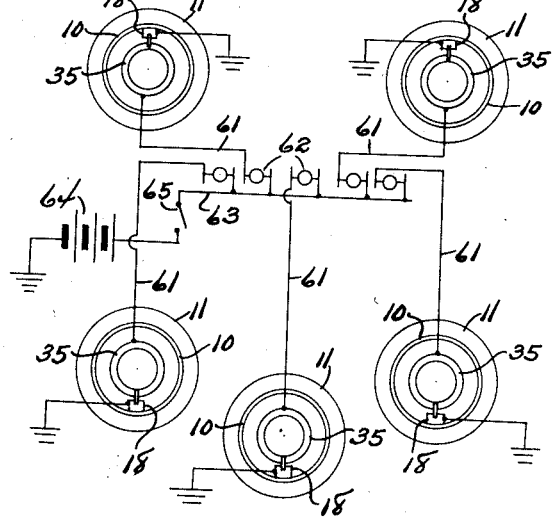
Oliver C. Spurlock
INVENTOR
BY Victor J. Evans & Co.
ATTORNEYS March 26, 1940.   O. C. SPURLOCK   2,195,155
AIR PRESSURE INDICATOR SWITCH
Filed June 26, 1939   3 Sheets-Sheet 3
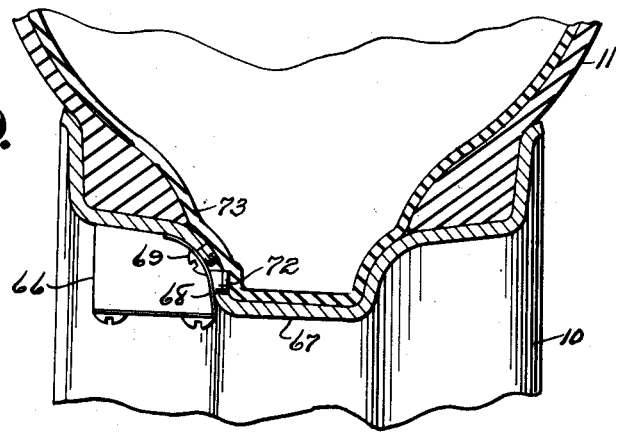
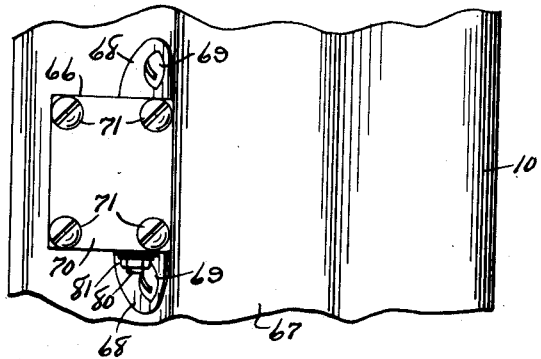
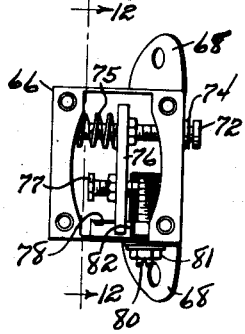 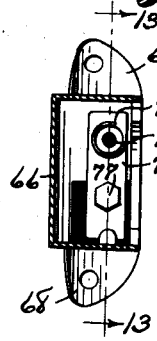 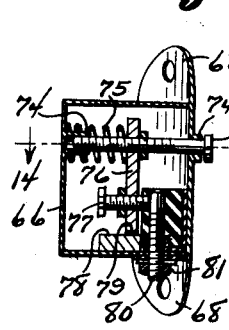 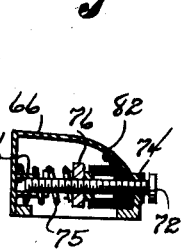
Oliver C. Spurlock
INVENTOR
BY Victor J. Evans & Co.
ATTORNEYS Patented Mar. 26, 1940

2,195,155

UNITED STATES PATENT OFFICE 2,195,155

AIR PRESSURE INDICATOR SWITCH

Oliver C. Spurlock, Burrton, Kans.

Application June 26, 1939, Serial No. 281,279

3 Claims. (Cl. 200—58)

This invention relates to air pressure indicators for pneumatic tires and has for an object to provide a simplified circuit closer adapted to be applied to the vehicle wheel and actuated by predetermined low pressure in the inner tube to energize a signal circuit and warn the driver that the tire needs additional air.

A further object is to provide simplified electrical connections between the circuit closer and an annular rotary contact ring carried by the brake drum so that danger of short circuits will be reduced to a minimum.

A further object is to provide simplified brush mechanism carried by the stationary flange of the drum with which the contact ring has wiping engagement to assure good electrical connections throughout the relatively movable parts of the signal circuits.

A further object is to provide apparatus of this character which will be formed of a few strong simple and durable parts which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a cross sectional view through a vehicle wheel and pneumatic tire equipped with an air pressure indicator constructed in accordance with the invention.

Figure 2 is a fragmentary side elevation of the wheel and parts of the invention shown in Figure 1.

Figure 3 is a fragmentary longitudinal sectional view taken on the line 3—3 of Figure 1.

Figure 4 is a detail cross sectional view taken on the line 4—4 of Figure 2, drawn to enlarged scale.

Figure 5 is a detail cross sectional view taken on the line 5—5 of Figure 2.

Figure 6 is a detail cross sectional view taken on the line 6—6 of Figure 2.

Figure 7 is a detail cross sectional view showing the brush and conductor ring.

Figure 8 is a diagrammatic view showing the electrical connections of the circuit closers on the wheels and respective pilot lamps.

Figure 9 is a detail cross sectional view of another form of the invention in which the circuit closer is disposed on the side of the rim rather than on the inner periphery of the rim.

Figure 10 is a fragmentary bottom plan view of the parts shown in Figure 9.

Figure 11 is a top plan view of the circuit closer shown in Figure 9.

Figure 12 is a cross sectional view taken on the line 12—12 of Figure 11.

Figure 13 is a cross sectional view taken on the line 13—13 of Figure 12.

Figure 14 is a cross sectional view taken on the line 14—14 of Figure 13.

Referring now to the drawings in which like characters of reference designate similar parts in the various views, 10 designates a tire rim, 11 a tire equipped with an inner tube 12, 13 a brake drum, 14 the stationary back plate of the drum, 15 the hub, 16 the axle, and 17 the axle housing of conventional automotive vehicle wheel construction.

In carrying out the invention, a circuit closer is mounted on each wheel and comprises a casing 18, best shown in Figure 3, having attaching tabs 19 at the bottom of the end walls through which screws 20 are passed to secure the casing to the inner periphery of the rim 10 as best shown in Figure 1. A plunger 21 is mounted radially in the casing and projects through an opening 22 in the rim to engage the inner tube 12. The plunger is threaded to receive a nut 24 and a helical spring 25 is sleeved on the plunger beyond the nut and bears against the end wall of the casing to yieldably hold the plunger in engagement with the inner tube. Adjustment of the nut varies the tension of the spring so that the plunger will yield inwardly with the tube upon predetermined low pressure condition in the tube.

A metal plate 26 is provided with an opening near one end to receive the plunger between the spring and the nut so that the plate moves as a unit with the plunger. The plate is equipped with a contact point 27 in the nature of a screw which is threadedly engaged in an opening near the free end of the plate and is provided with an adjusting nut 28.

A second contact point 29, in the nature of a screw, is engaged through an insulating bushing 30 disposed in an opening in one side wall of the housing and is held in position to be engaged by the contact point 27 through the medium of nuts 31 which bear against opposite sides of the bushing.

For confining the plunger 21 and the plate 26 to rectilinear movement a tubular guide 32 is fixed to the inner wall of the casing within the spring 25 and slidedly receives the adjacent end of the plunger. A guide rib 33 is secured to the end wall above the insulating bushing 30 and the plate is provided with a notch in the end edge to receive the guide rib.

A nut lock 34, in a nature of an L-shaped blank of insulating material, is disposed on the screw 29 and contacts with one of the wrench faces of the inner nut 31 to prevent the nut from turning and changing the adjustment of the screw.

A contact ring 35 is fixed to the inner face of the brake drum 13 concentric with the axle 16 as best shown in Figures 1 and 6. For this purpose blocks 36 of insulating material are interposed between the ring and the drum and a screw 37 is advanced through the ring into one end of each block. A screw 38 is advanced through the drum and into the other end of the block. An insulating bushing 39 is disposed around the screw 38.

For electrically connecting the ring with the contact screw 29, a leaf spring 40 is secured intermediate its ends to the outer face of the conventional disc 41 which forms the spokes of the drop center rim wheel illustrated. For this purpose a screw 42 is engaged through an opening in the leaf spring and threaded into the disc. A block of insulation 43 is interposed between the spring and the disc and is provided with integral bushings 44 and 45 which insulate the spring from the screw and from the disc. A conductor wire 46 is secured to the leaf spring at one end and at the other end is secured to the screw 29 which forms a stationary contact point as previously described.

A screw 47 is engaged through the contact ring 35 and extends through an insulating bushing 48 which projects through an opening in the brake drum 13. The screw abuts the end of the leaf spring 40 and holds the leaf spring under slight tension so that good electrical contact between the screw and the leaf spring is promoted.

The signal circuit is conducted from the rotating contact ring 35 through the stationary back plate 14 of the brake drum through the medium of a hollow tube 49 best shown in Figures 1 and 7. The tube is exteriorly threaded and is engaged through a threaded opening 50 formed in an insulated plate 51 which is secured to the back plate 14 of the brake drum through the medium of insulated screws 52. A lock washer 53 is threaded onto the tube and bears against the insulated plate 51 to hold the tube against dislodgement. The tube projects through an enlarged opening 54 formed in the back plate, and extends toward the contact ring 35. A plunger 55 is disposed in one end of the tube and the contact ring has wiping engagement with the plunger. The plunger is yieldably held at its outer limit of movement through the medium of a helical spring 56 which is disposed in the bottom of the tube 49 and bears at its outer end against the head of an adjusting screw 57 which is threaded through a cap 58 on the outer end of the tube. The screw 57 may be adjusted to regulate the tension of the spring 56.

In order that the wheel may be put on the brake drum in only one way so that the leaf spring 40 will always register with the screw 47 and thus eliminate the possibility of disconnecting the wire 46, a guide lug 59, shown best in Figure 5, is secured to the brake drum 13 and is adapted to be received in a guide opening 60 formed in the flange of the disc 41 of the wheel.

As shown diagrammatically in Figure 8, each circuit closer is connected by a conductor wire 61 to a respective pilot lamp 62 located within convenient reach of the driver of the vehicle. All the pilot lamps are connected by a common conductor wire 63 to the battery 64. A switch 65 is interposed in the conductor wire 63 for energizing the signal circuits to test the tire pressure. When testing the tire pressure, should any tire be dangerously low, the contact points of the respective circuit closer will be in engagement with each other so that the respective pilot lamp will light. The diagram shows five wheels, but as will be obvious, one of these wheels is the usual spare.

A modified form of the invention is shown in Figures 9 to 14 inclusive. In this form of the invention the only difference is in the location of the circuit closer on the side of the rim and the arrangement of the contacts so that the latter will no be affected by centrifugal force.

In the modified form of the invention, 66 designates a housing shaped to fit snugly against the side of the drop center rim 67 and is provided with mounting lugs 68 through which securing screws 69 are passed and threaded into the side of the rim as shown in Figure 9. The housing is provided with a removable cover 70 which is secured in place by screws 71 as shown in Figure 10.

By referring to Figures 13 and 14 it will be seen that the plunger 72 is mounted in the housing to extend laterally through the housing to engage the inner tube 73 instead of extending radially through the housing and thus centrifugal force cannot interfere with the performance of the plunger. The plunger is mounted to slide in guides 74 formed on the housing and is urged toward the tire by a helical spring 75 which is sleeved on the plunger and bears against a contact point support plate 76 carried by the plunger as previously described.

A contact point 77 is adjustably mounted and is confined to rectilinear movement through the medium of a guide rib 78 formed on the casing and engaged in a guide slot 79 formed in the end of the plate 76.

A second contact point 80 is mounted in the casing to extend perpendicular to the plunger 72 and is in the nature of a screw which is confined in place through the medium of nuts 81, best shown in Figure 11, the inner nut being held against dislodgement by a substantially L-shaped lock member 82 as previously described.

From the above description it is thought that the construction and operation of the invention will be fully understood without further explanation.

What is claimed is:

1. A circuit closer for mounting on the rim of a pneumatic tire, comprising a casing having attaching tabs, a plunger in the casing adapted to project through the rim and engage the inner tube of the tire, an adjusting nut threaded on the plunger, a helical spring responsive to inner tube pressure between the nut and the casing, a metal plate secured at one end to the plunger between the spring and the nut to move as a unit with the plunger, a contact point projecting at a right angle from the plate, a second contact point carried by and insulated from the casing and adapted to be engaged by the first named contact point in circuit closing position, and guide means carried by the casing for confining the plunger and the plate to rectilinear movement toward and away from the inner tube.

2. The combination with a drop center rim and pneumatic tire thereon, of a circuit closer comprising a casing secured to the side of the rim, a plunger in the casing extending laterally through the rim and engaging the inner tube of the tire, an adjusting nut threaded on the plunger, a helical spring responsive to inner tube pressure between the nut and the casing, a metal plate secured at one end to the plunger between the spring and the nut to move as a unit with the plunger, a contact point projecting at a right angle from the plate, a second contact point carried by and insulated from the casing and adapted to be engaged by the first named contact point in circuit closing position, and guide means carried by the casing for confining the plunger and the plate to rectilinear movement toward and away from the inner tube.

3. A circuit closer for mounting on the rim of a pneumatic tire, comprising a casing having attaching tabs, a plunger in the casing adapted to project through the rim and engage the inner tube of the tire, an adjusting nut threaded on the plunger, a helical spring responsive to inner tube pressure between the nut and the casing, a metal plate secured at one end to the plunger between the spring and the nut to move as a unit with the plunger, a contact point projecting at a right angle from the plate, a second contact point carried by and insulated from the casing and adapted to be engaged by the first named contact point in circuit closing position, a guide rib on the casing interfitting with the free end of the plate, and a guide tube on the casing receiving the plunger, said rib and tube restricting the plunger and the plate to rectilinear movement.

OLIVER C. SPURLOCK.